(12) United States Patent
Hong et al.

(10) Patent No.: US 8,462,720 B2
(45) Date of Patent: Jun. 11, 2013

(54) TRANSMISSION/RECEPTION APPARATUS AND METHOD FOR FRAME INCLUDING PROTOCOL VERSION IN ULTRA WIDEBAND SYSTEM

(75) Inventors: Seung Eun Hong, Daejeon (KR); Kyeongpyo Kim, Daejeon (KR); Woo Yong Lee, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 358 days.

(21) Appl. No.: 12/858,860

(22) Filed: Aug. 18, 2010

(65) Prior Publication Data

US 2011/0044271 A1 Feb. 24, 2011

(30) Foreign Application Priority Data

Aug. 18, 2009 (KR) .......... 10-2009-0076180
Apr. 29, 2010 (KR) .......... 10-2010-0039788
Jul. 5, 2010 (KR) .......... 10-2010-0064453

(51) Int. Cl.
*H04W 4/00* (2009.01)
(52) U.S. Cl.
USPC ............ 370/329; 370/338; 370/341
(58) Field of Classification Search
None
See application file for complete search history.

(56) References Cited

U.S. PATENT DOCUMENTS

| 2006/0015587 | A1 | 1/2006 | Bose |
| 2007/0153830 | A1* | 7/2007 | Xhafa et al. ............ 370/470 |
| 2007/0180467 | A1 | 8/2007 | Lee et al. |
| 2008/0137718 | A1* | 6/2008 | Cha et al. ............ 375/146 |
| 2010/0208618 | A1* | 8/2010 | Kim et al. ............ 370/254 |
| 2010/0246543 | A1* | 9/2010 | Rajkotia et al. ............ 370/338 |
| 2010/0246600 | A1* | 9/2010 | Das et al. ............ 370/465 |
| 2010/0260236 | A1* | 10/2010 | Batra et al. ............ 375/146 |
| 2010/0261429 | A1* | 10/2010 | Batra et al. ............ 455/41.2 |
| 2011/0317722 | A1* | 12/2011 | Gaddam et al. ............ 370/474 |

FOREIGN PATENT DOCUMENTS

KR 2003-0016984 A 3/2003

* cited by examiner

*Primary Examiner* — Chi Pham
*Assistant Examiner* — Soon-Dong D Hyun
(74) *Attorney, Agent, or Firm* — Rabin & Berdo, P.C.

(57) ABSTRACT

Provided is a transmission/reception apparatus and method for transmitting a frame in an ultra wideband radio communication system, which may enable a protocol version to be included in a fixed-length physical layer protocol (PHY) header so that interaction between systems using different protocol versions may be realized, and may enable information about a modulation and coding scheme to be included in a variable-length PHY header to thereby overcome a decoding delay problem occurring due to a Reed Solomon code.

17 Claims, 6 Drawing Sheets

TRANSMISSION/RECEPTION APPARATUS AND METHOD FOR FRAME INCLUDING PROTOCOL VERSION IN ULTRA WIDEBAND SYSTEM

CROSS-REFERENCE TO RELATED APPLICATIONS

This application claims the benefit of Korean Patent Application Nos. 10-2009-0076180, filed on Aug. 18, 2009, 10-2010-0039788, filed on Apr. 29, 2010, and 10-2010-0064453 filed on Jul. 5, 2010 in the Korean Intellectual Property Office, the disclosures of which are incorporated herein by reference.

BACKGROUND 1. Field of the Invention

Embodiments of the present invention relate to an apparatus and method that generate a frame including a protocol version used for distinguishing between a system using an older version and a system using a newer version in an ultra-wideband radio communication system.

2. Description of the Related Art

In a conventional ultra-wideband radio communication system, a protocol header may include a fixed-length physical layer protocol (PHY) header, a variable-length PHY header, and a Media Access Control (MAC) header. The fixed-length PHY header may be encoded into a recursive code, and the variable-length PHY header and the MAC header may be encoded into a Reed Solomon code (RS code). A significant amount of time may be required for generally decoding the RS code, and a significant amount of data information subsequent to the protocol header may be received while decoding the RS code.

In the conventional ultra-wideband radio communication system, reception processing information of the data information may be included in the variable-length PHY header. Accordingly, a reception apparatus may need to perform buffering of the received data information until the variable-length PHY header is decoded. Due to a significant amount of the buffering in the ultra-wideband radio communication system, a memory having a high cost may be required. Accordingly, there is a desire for a method of reducing the amount of the buffering. Also, there is a desire for a method of distinguish between an existing older protocol and a newer protocol where the method of reducing the amount of the buffering is applied, so that the older protocol and the newer protocol may co-exist.

SUMMARY

An aspect of the present invention provides an apparatus and method of transmitting and receiving a frame including a protocol version in an ultra-wideband radio communication system.

Another aspect of the present invention provides a configuration of a protocol header including a protocol version for distinguishing an older version system and a newer version system in an ultra-wideband radio communication system.

Still another aspect of the present invention provides a configuration of a protocol header that may overcome a decoding delay problem occurring due to a Reed Solomon code (RS code) by enabling information about modulation and coding schemes to be included in a fixed-length physical layer protocol (PHY) header, and provides an apparatus and method of transmitting and receiving a frame including a new version protocol header.

According to an aspect of the present invention, there is provided a transmission apparatus for transmitting a frame in an ultra-wideband radio communication system, the transmission apparatus including: a frame generation unit to generate a physical layer (PHY) Protocol Data Unit (PPDU) frame including a Physical Layer Convergence Protocol (PLCP) preamble, a PLCP header, a PPDU payload, and an antenna training sequence; and a mode insertion unit to insert, in a fixed length-physical layer header of the PLCP header, information about a mode of a first segment when the PPDU frame is generated, the mode being included in the PPDU frame.

According to another aspect of the present invention, there is provided a reception apparatus for receiving a frame in an ultra-wideband radio communication system, the reception apparatus including: a frame reading unit to receive a PPDU frame including a PLCP preamble, a PLCP header, a PPDU payload, and an antenna training sequence, and to read the received PPDU frame; and a mode verification unit to verify a mode of a first segment included in a fixed length-physical layer header of the PLCP header when reading the PPDU frame, and to verify a modulation and coding scheme of the first segment.

According to still another aspect of the present invention, there is provided a method of transmitting a frame in an ultra-wideband radio communication system, the method including: verifying a predetermined PLCP preamble corresponding to a protocol version, the PLCP preamble being inserted in a PPDU frame, or inserting, in a fixed length-physical layer header of a PLCP header, the protocol version; inserting, in the fixed length-physical layer header, a mode of a first segment included in a PPDU payload, the mode indicating a modulation and coding scheme for the first segment; and generating a PPDU frame including the PLCP preamble, the PLCP header, the PPDU payload, and an antenna training sequence.

According to yet another aspect of the present invention, there is provided a method of transmitting a frame in an ultra-wideband radio communication system, the method including: receiving a PPDU frame including a PLCP preamble, a PLCP header, a PPDU payload, and an antenna training sequence; verifying a predetermined protocol version corresponding to the PLCP preamble, or verifying a protocol version included in a fixed length-physical layer header of the PLCP header; verifying a mode of a first segment included in the PPDU payload when the protocol version is a new version, to verify a modulation and coding scheme of the first segment; and demodulating the first segment included in the PPDU payload using the mode of the first segment.

Additional aspects, features, and/or advantages of the invention will be set forth in part in the description which follows and, in part, will be apparent from the description, or may be learned by practice of the invention.

EFFECT

According to embodiments of the present invention, there is provided an apparatus and method that may, in an ultra-wideband radio communication system, transmit and receive a frame including a fixed-length physical layer protocol (PHY) header including information about a protocol version and information about a modulation and coding scheme, so that interaction between systems using different protocol versions from each other may be realized. Also, the information about a modulation and coding scheme may be included in the fixed-length PHY header to overcome a decoding delay problem occurring due to a Reed Solomon code (RS code).

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
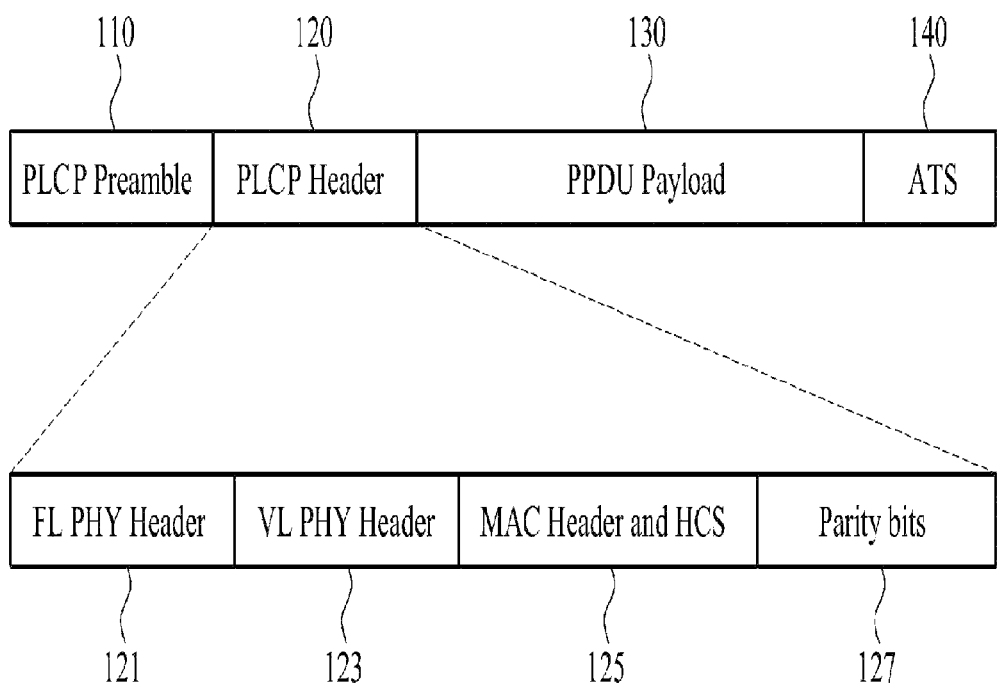
FIG. 1 is a diagram illustrating a structure of a physical layer (PHY) Protocol Data Unit (PPDU) frame in an ultra-wideband radio communication system according to a conventional art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The present invention relates to an apparatus and method of transmitting and receiving a frame in an ultra-wideband radio communication system, which may enable information about a protocol version and information about a modulation and coding scheme to be included in a fixed-length physical layer protocol (PHY) header of the frame, so that interaction between systems using different protocol versions from each other may be realized, and a decoding delay problem occurring due to a Reed Solomon code (RS code) may be overcome.

FIG. 1 is a diagram illustrating a structure of a physical layer (PHY) Protocol Data Unit (PPDU) frame in an ultra-wideband radio communication system according to a conventional art.

Referring to FIG. 1, the PPDU frame includes a Physical Layer Convergence Protocol (PLCP) preamble 110, a PLCP header 120, a PPDU payload 130, and an antenna training sequence (ATS) 140. In this instance, the PLCP header 120 may be a field corresponding to a protocol header.

The PLCP preamble 110 may be used for the purpose of assisting a timing synchronization, a carrier offset recovery, and a channel estimation which may be performed in a reception apparatus receiving the PPDU frame. Specifically, the reception apparatus may accurately perform the timing synchronization, the carrier offset recovery, and the channel estimation using the PLCP preamble 110. In this instance, the PLCP preamble 110 may include a frame synchronization sequence and a channel estimation sequence. In FIG. 1, the PPDU frame according to an embodiment may further include an Antenna Training Indicator Field (ATIF) (not illustrated) among between a variable-length (VL) PHY header 123 and a Media Access Control (MAC) header and Header Check Sequence (HCS) 125. In this instance, the ATIF may be a field indicating information required for antenna training. Here, the information required for the antenna training may include information about a number of training symbols for the antenna training.

The PLCP header 120 may include information about a PHY and MAC required for decoding the PPDU payload 130 in the reception apparatus. Specifically, the reception apparatus may successfully decode the PPDU payload 130 using the information included in the PLCP header 120.

As illustrated in FIG. 1, the PLCP header 120 includes a fixed-length (FL) PHY header 121, the VL PHY header 123, and the MAC header and HCS 125. The PHY header may be defined as including the FL PHY header and the VL PHY header. Also, the PHY header may be defined as including the FL PHY header, the VL PHY header, and an ATIF. Also, the PLCP header 120 may further include parity bits 127, that is, an error correction code.

The FL PHY header 121 may have a fixed length and length information of the MAC header. In this instance, the length information of the MAC header may be a number of MAC Service Data Units (MSDUs). Also, a Protocol Data Unit (PDU) may signify a PPDU.

The VL PHY header 123 may have a variable length and information about segments constituting a PDU frame.

The MAC header and HCS 125 may include MSDU information. In this instance, the MSDU information may include frame control information, a destination address, a source address, and sequence information for MSDU. Here, the sequence information for MSDU may include a plurality of fields, depending on whether the MSDUs are gathered in an MAC layer. Accordingly, a length of the MAC header may be variable depending on a number of the MSDUs gathered in the MAC layer.

In this instance, the HCS may be information used for checking an error in a combination of the FL PHY header 121, the VL PHY header 123, and the MAC header. The HCS may be configured using a Consultative Committee on International Telephone and Telegraphy (CCITT) and a Cyclic Redundancy Check (CRC)-16 HCS.

The parity bits 127 may include PPDU frame information and information used for correcting an error in an encoding of the PPDU frame.

The PPDU payload 130 may include at least one segment transmitted to the reception apparatus.

The ATS 140 may include information for antenna training between a transmission apparatus transmitting the PPDU frame and the reception apparatus.

In this instance, the antenna training may denote a process of exchanging an antenna parameter to maximize a link performance determined between communication apparatuses. In general, the communication apparatus performing the antenna training may select a sector through the antenna training process, or adjust a transmission/reception beam pattern.

Figure 2:
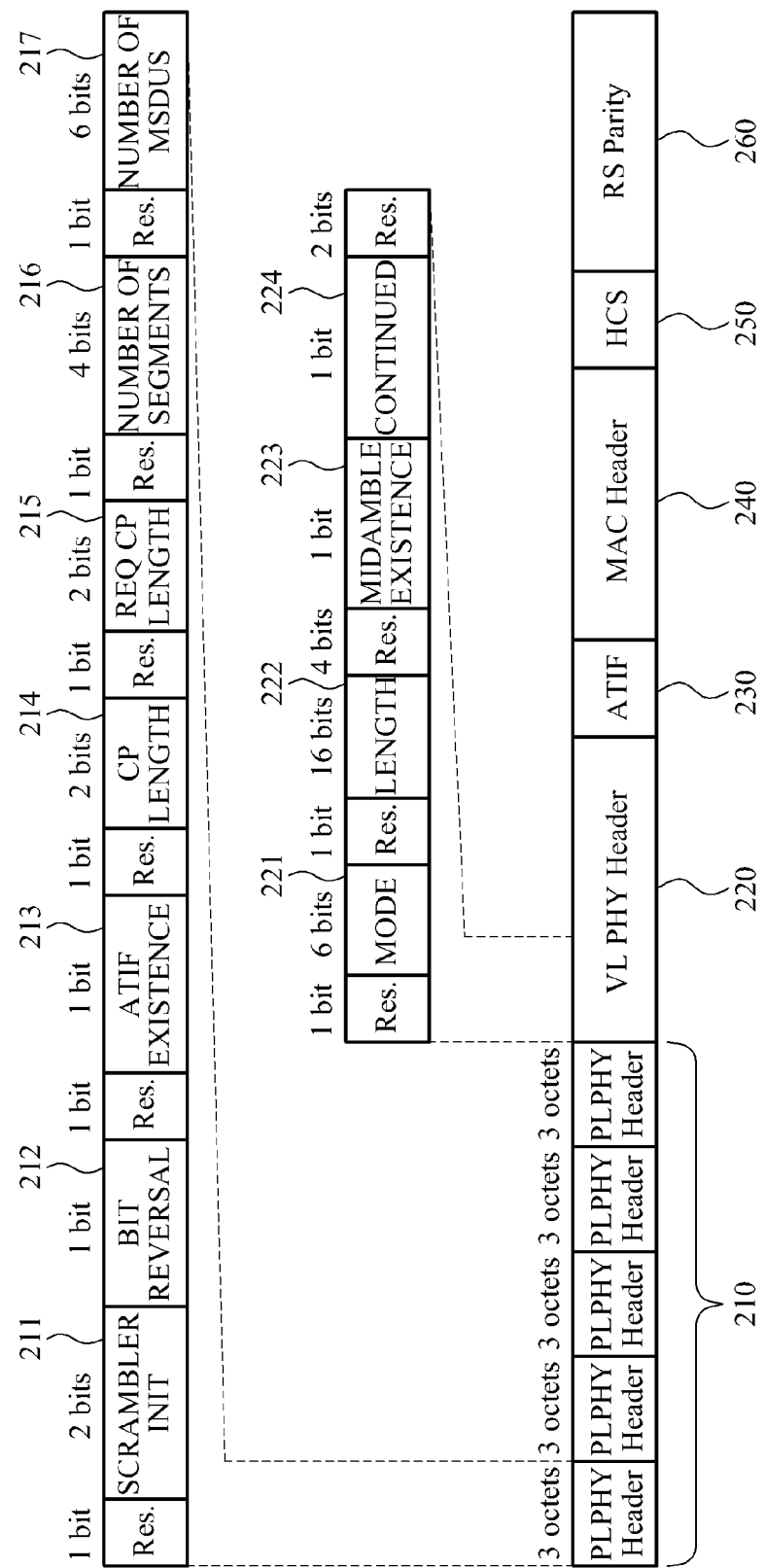
FIG. 2 is a diagram illustrating a specific configuration of a Physical Layer Convergence Protocol (PLCP) header included in the PPDU frame of FIG. 1.

FIG. 2 is a diagram illustrating a specific configuration of a Physical Layer Convergence Protocol (PLCP) header included in the PPDU frame of FIG. 1. Referring to FIG. 2, the PLCP header includes an FL PHY header 210, a VL PHY header 220, an Antenna Training Indicator Field (ATIF) 230, an MAC header 240, an HCS 250, and a Reed Solomon (RS) Parity 260.

In FIG. 2, 'Res.' may denote a reserved field including supplementary information, as necessary. Also, in FIG. 2, each of the VL PHY header 220, the MAC header 240, the HCS 250, and the RS Parity 260 may include the same information as that of the corresponding fields of FIG. 1.

In this instance, the ATIF 230 may include a number of training symbols for antenna training. The ATIF 230 may further include supplementary information required for the antenna training.

Referring to FIG. 2, the FL PHY header 210 may include a 5-repetition FL PHY header generated using a repetition coding scheme. Each of the FL PHY headers may be configured of 3 octets.

In this instance, each of the FL PHY headers may include a SCRAMBLER INIT 211, a BIT REVERSAL 212, an ATIF EXISTENCE 213, a CP LENGTH 214, a REQ CP LENGTH 215, a NUMBER OF SEGMENT 216, and a NUMBER OF MSDUs 217.

The SCRAMBLER INIT 211 may denote a scrambler seed value. The BIT REVERSAL 212 may denote whether a bit inversion (BI) for a payload occurs when using an On-Off Keying (OOK) modulation. The ATIF EXISTENCE 213 may denote whether an ATIF field exists between the VL PHY header and the MAC Header.

The CP LENGTH 214 may denote a Cyclic Prefix (CP) length for a current frame.

The REQ CP LENGTH 215 may denote a CP length for a following frame.

The NUMBER OF SEGMENT 216 may denote a number of segments within a PDU frame. The NUMBER OF MSDUs 217 may denote a number of MSDUs included in a frame. In this instance, the number of the MSDUs may denote a number of MSDUs gathered in an MAC layer of a communication apparatus. Accordingly, when a value of the NUMBER OF MSDUs 217 is '1', the MSDUs may not be gathered and a length of the MAC header may express 10 bytes. When a value of the NUMBER OF MSDUs 217 is N (N=2, 3, . . . , n), an N-number of MSDUs may be gathered, and the length of the MAC may express 10+4*N bytes.

The VL PHY header 220 may be repeated by a number of segments within the PDU frame. In this instance, the VL PHY header 220 may include a MODE 221, a LENGTH 222, a MIDAMBLE EXISTENCE 223, and a CONTINUDED 224.

Here, the MODE 221 may denote a modulation and coding scheme of a corresponding segment. The LENGTH 222 may denote a length of a payload within the corresponding segment. The MIDAMBLE EXISTENCE 223 may denote whether a MIDAMBLE exists in an end of the corresponding segment. The CONTINUDED 224 may denote whether the corresponding segment is divided.

Figure 3:
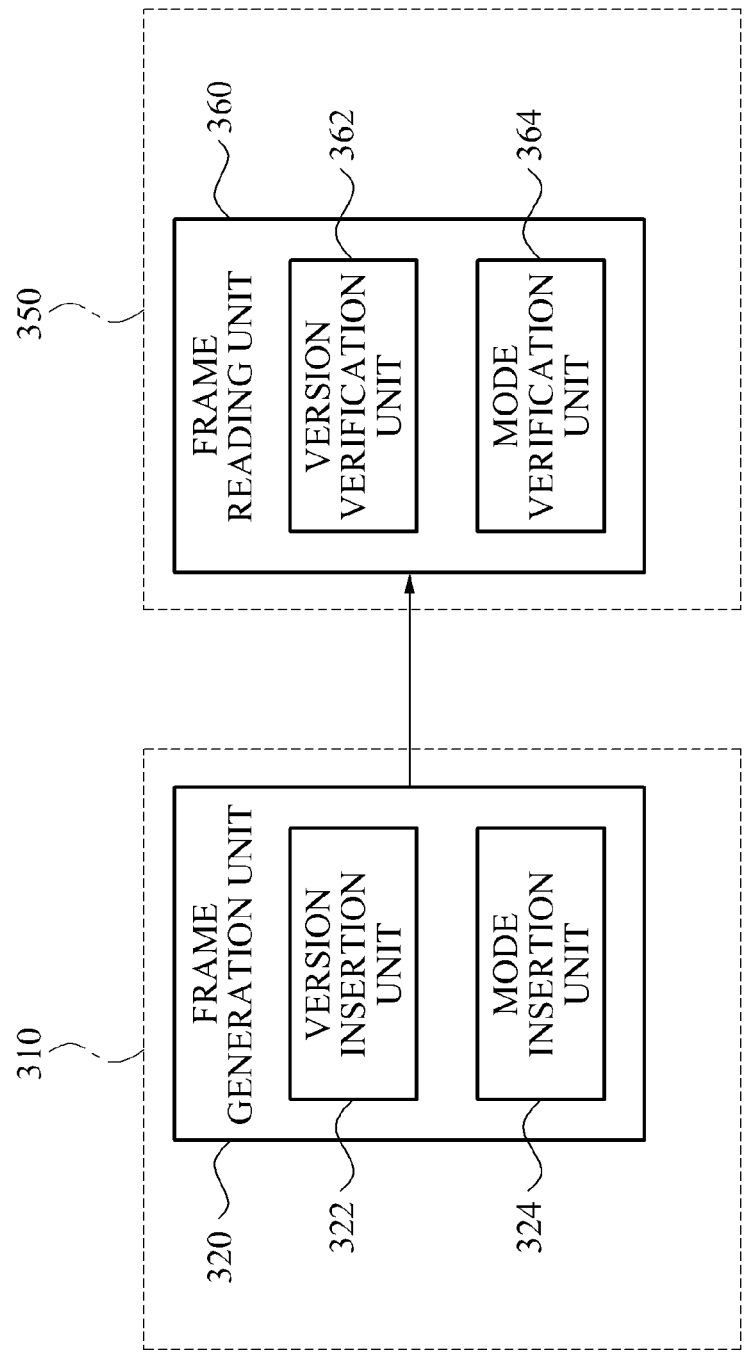
FIG. 3 is a diagram illustrating a configuration of a transmission/reception apparatus of an ultra-wideband radio communication system according to an embodiment.

FIG. 3 is a diagram illustrating a configuration of a transmission/reception apparatus of an ultra-wideband radio communication system according to an embodiment.

Referring to FIG. 3, the ultra-wideband radio communication system includes a transmission apparatus 310 and a reception apparatus 320.

The transmission apparatus 310 includes a frame generation unit 320 generating a PPDU frame including a PLCP preamble, a PLCP header, a PPDU payload, and an ATS.

The frame generation unit 320 includes a version insertion unit 322 inserting, in the PPDU frame, information about a protocol version of the PPDU frame and a mode insertion unit 324 inserting a mode of a first segment in an FL PHY header of the PLCP header.

The protocol version may be most easily expressed using the PLCP preamble. The ultra-wideband radio communication system may denote different PLCP preambles depending on a type A apparatus, a type B apparatus, and a type C apparatus.

Also, in the type A apparatus, different PLCP preambles depending on a Single Carrier Block Transmission (SCBT) scheme an orthogonal frequency division multiplexing (OFDM) scheme may be used.

To distinguish between the protocol versions, the version insertion unit 322 may predetermine a new PLCP preamble based on the respective type apparatuses and/or a protocol version, and may express the protocol version using the predetermined PLCP preamble.

As another example of expressing the protocol version, the protocol version may be expressed using unused bit information of a protocol header. In the FL PHY header positioned immediately behind the PLCP preamble, a six-number of unused reserved bits (hereinafter, referred to as 'Res bit') may exist, and corresponding positions of the Res bits may be scattered. The version insertion unit 322 may insert the protocol version in the FL PHY header, using at least one of the Res bits of the FL PHY header. Specifically, a number of bits used for the protocol version may be one bit, two bits, three bits, four bits, five bits, or six bits.

The VL PHY header and the MAC header may be encoded using an RS code. In general, a significant amount of time may be required for decoding the RS code. Interpretation for the mode of the first segment of the VL PHY header may be delayed and thus, a problem in that a first segment constituting the PPDU payload fails to be processed and is buffered instead of processed may arise. To overcome the problem, the mode insertion unit 324 may insert the mode of the first segment in the FL PHY header of the PLCP header. In this instance, the mode of the first segment may be information indicating a modulation and coding scheme for the first segment included in the PPDU payload.

When desiring to use currently used fields of the FL PHY header as are, the mode insertion unit 324 may use a part of the Res bits to express the protocol version, and use the remaining Res bits as a first mode field indicating the mode of the first segment.

In Table 1, mode values used in the ultra-wideband radio communication system may be classified for each apparatus.

Even though first mode field may be configured of 6 bits, the first mode field used for each apparatus may be 5 bits as a maximum.

Specifically, the type A apparatus using the SCBT preamble may be signalized using a 4-bit space, and the type A apparatus using the OFDM preamble may be signalized actually using a 3-bit space even though using a 5-bit space. Also, the type B apparatus and the type C apparatus may be signalized using a 3-bit space and a 2-bit space, respectively. Accordingly, a one bit or two bits of the Res bits may be used for expressing a version field, and the remaining 5 bits or 4 bits of the Res bits may be used as the first segment mode.

TABLE 1

| Type of preamble | Range of used mode value |
| --- | --- |
| Type A SCBT | 0b000000~0b001101 |
| Type A OFDM | 0b001110~0b010101 |
| Type B | 0b101001~0b101101 |
| Type C | 0b111000~0b111010 |

A reception apparatus 350 may include a frame reading unit 360 of receiving a PPDU frame including a PLCP preamble, a PLCP header, a PPDU payload, and an ATS, and reading the received information. In this instance, the frame reading unit 360 may include a version verification unit 362 verifying a protocol version and a mode verification unit 364 verifying a mode of a first segment.

When version information is displayed through the PLCP preamble, the version verification unit 362 may verify a predetermined protocol version corresponding to the PLCP preamble as the protocol version.

The mode verification unit 364 may verify the mode of the first segment included in the FL PHY header of the PLCP header to verify a modulation and coding scheme of the first segment.

The reception apparatus 350 may include a demodulation unit (not illustrated) demodulating the first segment of the PPDU payload using the mode of the first segment read in the mode verification unit 364. Hereinafter, an example where the reception apparatus may process a case where information about the protocol version and information about the mode of the first segment is inserted in the FL PHY header will be described with reference to FIG. 4.

Figure 4:
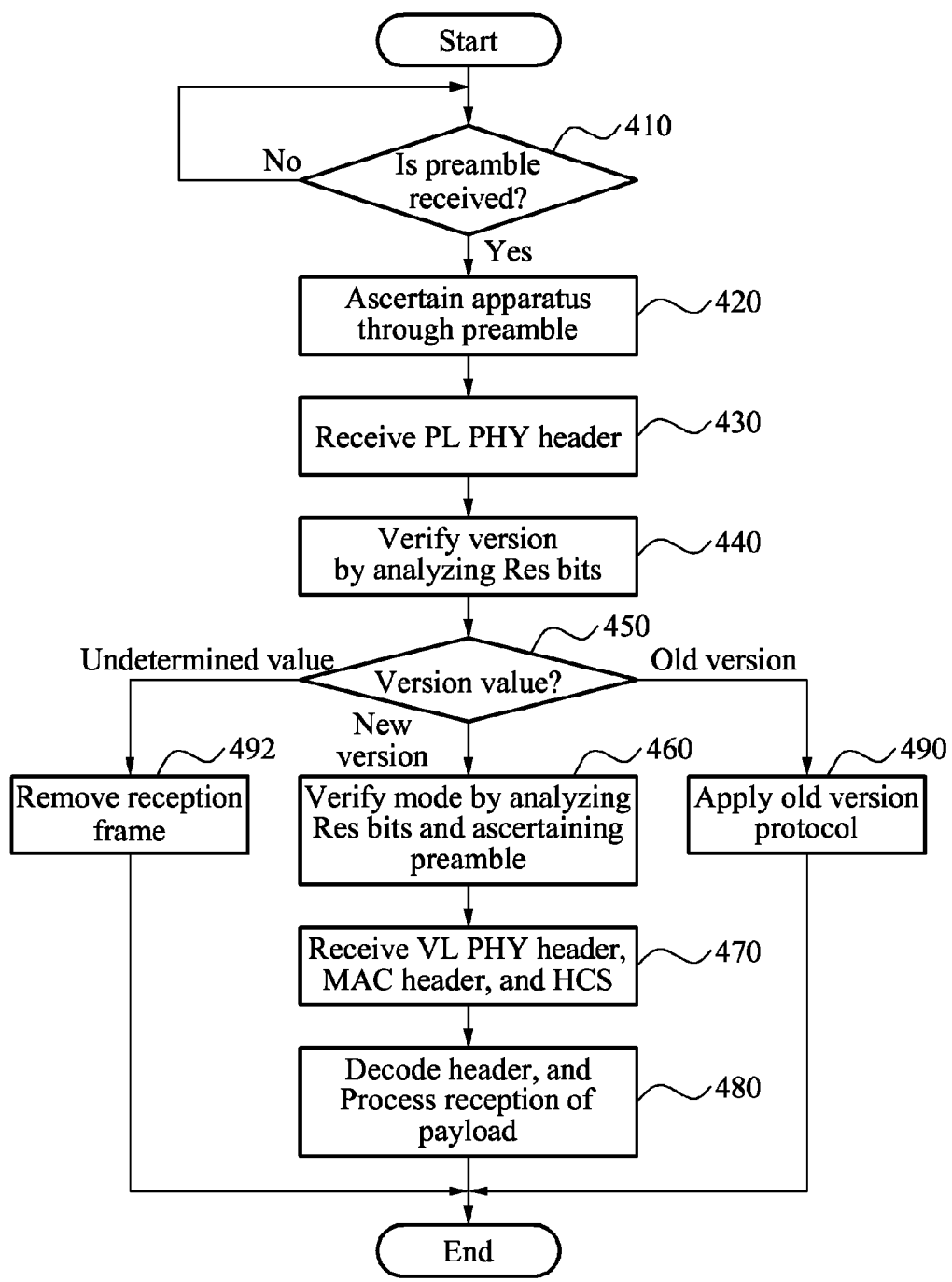
FIG. 4 is a flowchart illustrating a method of receiving a frame in a reception apparatus according to an embodiment.

FIG. 4 is a flowchart illustrating a method of receiving a frame in a reception apparatus according to an embodiment.

Referring to FIG. 4, in operation 410, a reception apparatus 350 may receive a PLCP preamble, and process the received PPDU frame.

In operation 420, the reception apparatus 350 may determine whether a type of the received preamble is a type A apparatus using an SCBT, a type A apparatus using an OFDM scheme, a type B apparatus, or a type C apparatus.

In operation 430, the reception apparatus 350 may receive an FL PHY header.

In operation 440, the reception apparatus 350 may decode the repeatedly received FL PHY headers. In this instance, the reception apparatus 350 may first interpret Res bits to verify a protocol version.

In operation 450, the reception apparatus 360 may verify whether the verified protocol version is an old version or a new version.

In operation 460, when the verified protocol version is the new version, the reception apparatus 350 may combine the remaining Res bit fields excluding the Res bit fields used for expressing the protocol version with information about the apparatus determined in operation 420 to thereby verify a mode of a first segment of a PPDU payload.

In operation 470, the reception apparatus 350 may receive a VL PHY header and an MAC header and HCS, and decode the received VL PHY header and the received MAC header and HCS.

In operation 480, the reception apparatus 350 may perform a reception process the PPDU payloads that are received while the decoding is performed in operation 470, using the mode of the first segment verified in operation 460.

In operation 480, the reception apparatus 350 may demodulate signals of the PPDU payloads to thereby convert the demodulated signal to bit information.

Even though the decoding for the VL PHY header and the MAC header and HCS is not completed in operation 470, the reception apparatus 350 may demodulate, to bit information, signals of the PPDU payloads that are received while the decoding is performed, and thereby a capacity of a buffer may be reduced.

In operation 490, when the protocol version is the old version based on a verified result of operation 450, the reception apparatus 350 may perform a corresponding procedure 5 based on the old version protocol.

In operation 492, when the protocol version is an undetermined value, the reception apparatus 360 may remove the received PPDU frame.

In the method of FIG. 4, when the PPDU payload includes at least two segments, and a length of a first segment of the payload is a significantly short while the first segment and a second segment have different mode values from each other, a problem may arise. Specifically, when a reception of the first segment is completed and a reception of the second segment starts while the decoding for the VL PHY header is performed, this may cause a malfunction such that the reception apparatus 350 processes a mode value of the second segment as a mode value of the first segment even though the mode value of the second segment is different from the mode value of the first segment.

To overcome the malfunction, even a length of the first segment may be enabled to be included in the FL PHY header. However, an available bit space may be insufficient when a length field of 16 bits is included in the FL PHY header.

Therefore, according to embodiments of the present invention, in a case of a payload including at least two segments having different mode values from each other, it may be possible to enable a first segment of the payload to have a sufficiently long length.

When it is possible to define the length field of 16 bits due to without using previous defined fields in the FL PHY header of FIG. 2, it may be possible to define the length field of 16 bits to be inserted in the FL PHY header.

A problem generated when the payload includes at least two segments, and the first segment and the second segment have different mode values from each other may be overcome as below.

To overcome the problem, the reception apparatuses according to an embodiment may determine a minimum value of the length of the first segment as an arbitrary value greater than a decoding delay time of a header code, and inform the transmission apparatuses of the determined minimum value.

Currently, the ultra-wideband radio communication system may inform peripheral devices of its own specification in such a manner that MAC capabilities information element (IE) field information and PHY capabilities IE field information may be included in a beacon frame to be transmitted.

Figure 5:
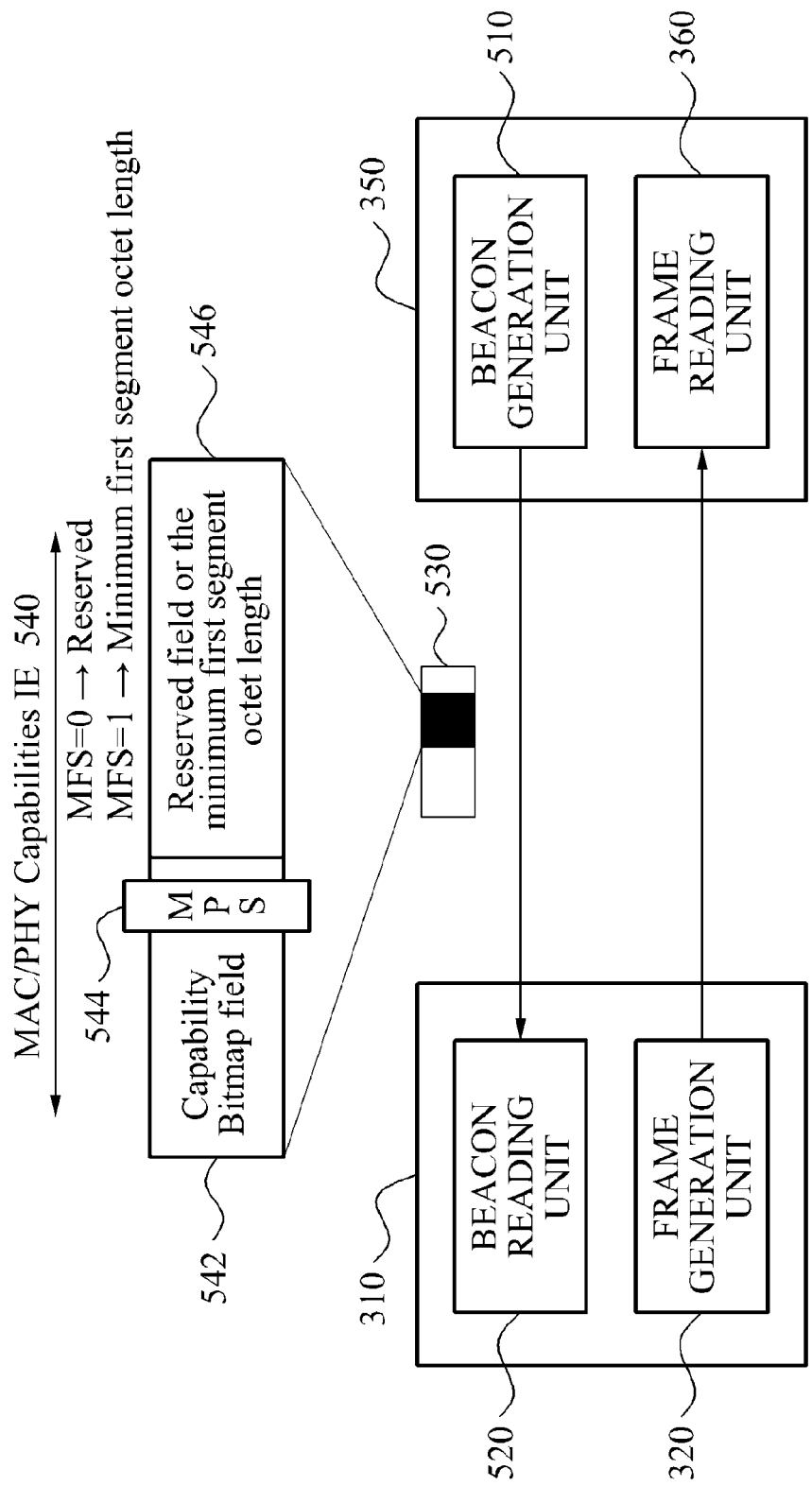
FIG. 5 is a diagram illustrating a configuration of a transmission/reception apparatus that may inform about a minimum length of a first segment in an ultra-wideband radio communication system according to an embodiment.

FIG. 5 is a diagram illustrating a configuration of a transmission/reception apparatus that may inform about a minimum length of a first segment in an ultra-wideband radio communication system according to an embodiment.

Referring to FIG. 5, according to an embodiment, a minimum value of a length of a first segment of a PPDU payload may be additionally defined in one IE among MAC/PHY Capabilities IE fields 540.

The reception apparatus 350 may include a beacon generation unit 510 that may enable a minimum length field 546 of the first segment to be included in the MAC/PHY Capabilities IE field 540 of a beacon frame 530.

Specifically, the beacon generation unit 510 may additionally define a Minimum First Segment (MFS) bit 544 within a capability bitmap field 542, in the MAC/PHY Capabilities IE field 540 that is transmitted through a beacon message. Next, the beacon generation unit 510 may set the MFS bit 544 as '1' at the time of transmission of multi-segments to display a limitation in the minimum length of the first segment, and use '1' as the minimum length field 546 of the first segment limiting a reserved field subsequent to '1'.

The transmission apparatus 310 may include a beacon reading unit 520 that may receive the beacon frame 530 from the reception apparatus 530, and verify a minimum length of the first segment through the minimum length field 546 of the first segment included in the MAC/PHY Capabilities IE field 540 of the beacon frame 530.

When generating a PPDU frame, the frame generation unit 320 may generate the length of the first segment to be greater than or equal to the minimum length of the first segment verified in the beacon reading unit 520.

Specifically, the frame generation unit 320 may need to guarantee the minimum length of the first segment that is informed through the MAC/PHY Capabilities IE field 540 by the reception apparatus 350.

When an amount of data to be transmitted to the first segment by the transmission apparatus 310 is less than an amount of the minimum length of the first segment informed by the reception apparatus 350, the frame generation unit 320 may satisfy the minimum length of the first segment by adding bytes each having a zero value, that is, zero padding bytes, to an end of the first segment. In this instance, the frame generation unit 320 may need to display a number of padding bytes so that the added zero padding bytes may be readily removed from the reception apparatus 350. To display the number of the padding bytes, unused reserved fields corresponding to a first segment in a VL PHY header may be used, or a difference between a value of a first MSDU length field of an MAC header, which corresponds to an actually available data length, and a value of a first segment length field within the VL PHY header, which corresponds to a length including the number of the zero padding bytes, may be used.

In addition, the ultra-wideband radio communication system may have a function to enable a plurality of segments to be included in a single PPDU frame, however, this function may need to be carefully considered.

When a channel is rapidly changed while transmitting the single PPDU frame, the function may adopt an optimum Modulation and Coding Scheme (MCS) for each of the segments constituting the PPDU frame.

However, in a case of a ultra-high speed radio communication scheme, since a time period required for transmission of the PPDU frame is significantly short, a probability where the channel is rapidly changed may be significantly reduced. Also, the transmission apparatus may not recognize a change in a state of the channel when the channel is rapidly changed, and may estimate the change in the state of the channel only when the reception apparatus feeds back channel state information. Accordingly, it may be impossible to adopt the MCS for each of the segments constituting the PPDU frame when transmitting the single PPDU frame.

So that the function to enable the plurality of segments to be included in the single PPDU frame is made available, a method where a plurality of dada having different priorities is segmented for each of the priorities when transmitting the plurality of dada in a type of the single PPDU frame, and the segments are transmitted in the MCS based on the priorities, respectively, may be used. However, in this method, an upper layer protocol that may perform a clustering with respect to the plurality of data having different priorities in the single PPDY frame type may become complex, and information about the clustering performed in a PHY upper layer may need to be interpreted in a PHY layer to segment the PPDU frame depending on a priority, and thereby an implementation of a PHY may become complex.

By transmitting the plurality of data having different priorities to different PPDU frames, the MCS based on the priority may be readily adopted.

Accordingly, the frame generation unit 320 may signalize such that a single segment is transmitted using a PLCP preamble and Res bits within the FL PHY header.

Alternatively, the frame generation unit 320 may set, as '1', a field value of the Number of Segment 216 to thereby display the transmission of the single segment.

When using only the former method, the Number of Segment 216 may be used as another application. In a case of the transmission of the single segment, the VL PHY header 220 may no longer has a variable length, and the MIDAMBLE EXISTENCE 223 and the CONTINUDED 224 of the VL PHY header 220 may be no longer required.

Also, according to the present embodiment, the MODE 221 may be included in the FL PHY header, which results in duplicated information. Accordingly, unnecessary or duplicated fields may be removed when generating the PPDU frame.

In addition, in a case of the transmission of the single segment, the LENGTH 222 may be configured of 16 bits and thus, a length of the PPDU frame may be limited as a length of 16 bits. To overcome the limitation, a number of bits of the LENGTH 222 may be expanded by further including unnecessary bit information and the Res bits of the VL PHY header 220.

When configuring the PPDU payload as the single segment, the frame generation unit may enable the LENGTH 222 to have the expanded bit number.

As a method of expanding the number of bits of the LENGTH 222, the frame generation unit 320 may enable the LENGTH 222 to have the expanded bit number using at least one of the Res bits of the VL PHY header. Also, the frame generation unit 320 may enable the LENGTH 222 to have the expanded bit number using a part of the MODE 221, the MIDAMBLE EXISTENCE 223, and the CONTINUDED 224.

Figure 6:
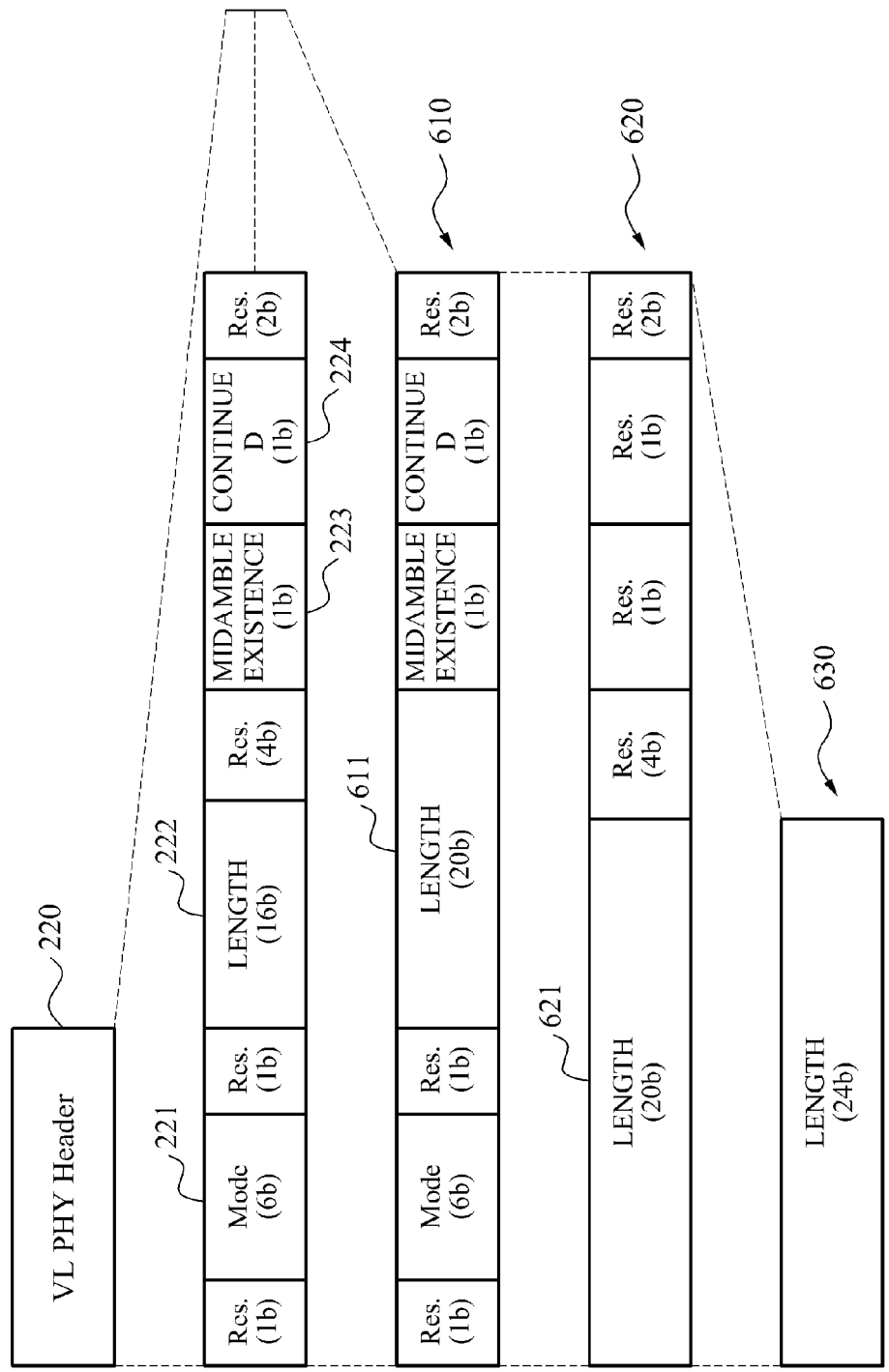
FIG. 6 is a diagram illustrating a structure of a variable-length PHY header for transmission of a single segment according to an embodiment.

FIG. 6 is a diagram illustrating a structure of a variable-length PHY header for transmission of a single segment according to an embodiment.

In FIG. 6, according to three embodiments applied when transmitting a single segment, a structure of each of VL PHY headers 610, 620, and 630 will be herein described. Referring to FIG. 3, the VL PHY header 610 may include a LENGTH 611 obtained by combining the existing LENGTH 222 and a neighboring Res. of 4 bits while adopting a structure of the existing VL PHY header.

The VL PHY header 620 may include a LENGTH 621 of 3 bytes obtained by combining the existing LENGTH 222, the MODE 221, and the Res. bits neighboring the MODE 221, and the remaining bits may be configured of the Res. bits.

The VL PHY header 630 may be configured of only a LENGTH of 3 bytes where the Res. bits are removed from the VL PHY header 620.

The PPDU frame according to an embodiment may be applied to a European Computer Manufacturers Association (ECMA) standard.

The methods according to the above-described embodiments may be recorded in non-transitory computer-readable storage media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. A transmission apparatus for transmitting a frame in an ultra-wideband radio communication system, the transmission apparatus comprising:
 a frame generation unit to generate a physical layer (PHY) Protocol Data Unit (PPDU) frame including a Physical Layer Convergence Protocol (PLCP) preamble, a PLCP header, a PPDU payload, and an antenna training sequence;
 a mode insertion unit to insert, in a fixed length-physical layer header of the PLCP header, information about a mode of a first segment when the PPDU frame is generated, the mode being included in the PPDU frame; and
 a beacon reading unit to receive a beacon frame from a reception apparatus, and to verify a minimum length of the first segment inserted in a Media Access Control (MAC) capabilities information element (IE) field of the beacon frame or a PHY capabilities IE field of the beacon frame.

2. The transmission apparatus of claim 1, wherein the mode of the first segment indicates a modulation and coding scheme for the first segment included in the PPDU payload.

3. The transmission apparatus of claim 1, wherein the mode insertion unit inserts, in the PPDU frame, information about the mode of the first segment using at least one of reserved bits of the fixed length- physical layer header.

4. The transmission apparatus of claim 1, further comprising:
 a version insertion unit to insert, in the PPDU frame, information about a protocol version of the PPDU frame when the PPDU frame is generated.

5. The transmission apparatus of claim 4, wherein the version insertion unit inserts, in the PPDU frame, a predetermined PLCP preamble corresponding to the protocol version when the PPDU frame is generated.

6. The transmission apparatus of claim 4, wherein the version insertion unit inserts the protocol version using at least one of reserved bits of the fixed length-physical layer header.

7. The transmission apparatus of claim 1,
 wherein, when generating the PPDU frame, the frame generation unit generates the length of the first segment to be equal to or greater than the minimum length of the first segment verified in the beacon reading unit.

8. The transmission apparatus of claim 1, wherein the frame generation unit enables a length field included in a variable length physical layer header of the PLCP header to have an expanded bit number, when configuring the PPDU payload as a single segment.

9. The transmission apparatus of claim 8, wherein the frame generation unit enables the length field to have the expanded bit number using at least one of reserved bits of the variable length physical layer header, when configuring the PPDU payload as the single segment.

10. The transmission unit of claim 8, wherein, when configuring the PPDU payload as the single segment, the frame generation unit generates the PPDU frame by removing at least one of a mode field indicating a modulation and coding scheme of a corresponding segment, a midamble existence field indicating whether a midamble exists in an end of the corresponding segment, a continued field indicating whether the corresponding segment is divided, and the reserved bits of the variable length physical layer header, and enables the length field to have the expanded bit number using at least one of the mode field, the midamble existence field, the continued field, and the reserved bits.

11. A reception apparatus for receiving a frame in an ultra-wideband radio communication system, the reception apparatus comprising:
 a frame reading unit to receive a PPDU frame including a PLCP preamble, a PLCP header, a PPDU payload, and an antenna training sequence, and to read the received PPDU frame;
 a mode verification unit to verify a mode of a first segment included in a fixed length-physical layer header of the PLCP header when reading the PPDU frame, and to verify a modulation and coding scheme of the first segment; and
 a beacon generation unit to enable a minimum length of the first segment to be included in an MAC capabilities IE field of a beacon frame or included in a PHY capabilities IE field of the beacon frame, and to transmit the minimum length.

12. The reception apparatus of claim 11, further comprising:
 a demodulation unit to demodulate the first segment of the PPDU payload using the first segment verified in the mode verification unit.

13. The reception apparatus of claim 11, further comprising:
 a version verification unit to verify information about a protocol version in the PPDU frame, when reading the PPDU frame.

14. The reception apparatus of claim 13, wherein the version verification unit verifies the PLCP preamble and a predetermined protocol version corresponding to the PLCP preamble to verify the protocol version.

15. The reception apparatus of claim 13, wherein the version verification unit verifies the protocol version using at least one of reserved bits of the fixed length-physical layer header.

16. A method of transmitting a frame in an ultra-wideband radio communication system, the method comprising:
 receiving a beacon frame from a reception apparatus;
 verifying a minimum length of a first segment inserted in a Media Access Control (MAC) capabilities information element (IE) field of the beacon frame or a PHY capabilities IE field of the beacon frame;
 verifying a predetermined PLCP preamble corresponding to a protocol version, the PLCP preamble being inserted in a PPDU frame, or inserting, in a fixed length-physical layer header of a PLCP header, the protocol version;
 inserting, in the fixed length-physical layer header, a mode of a first segment included in a PPDU payload, the mode indicating a modulation and coding scheme for the first segment; and
 generating a PPDU frame including the PLCP preamble, the PLCP header, the PPDU payload, and an antenna training sequence.

17. A method of transmitting a frame in an ultra-wideband radio communication system, the method comprising:
 receiving a PPDU frame including a PLCP preamble, a PLCP header, a PPDU payload, and an antenna training sequence;
 verifying a predetermined protocol version corresponding to the PLCP preamble, or verifying a protocol version included in a fixed length-physical layer header of the PLCP header;

verifying a mode of a first segment included in the PPDU payload when the protocol version is a new version, to verify a modulation and coding scheme of the first segment; and
demodulating the first segment included in the PPDU payload using the mode of the first segment; and
transmitting a minimum length of the first segment to be included in an MAC capabilities IE field of a beacon frame or included in a PHY capabilities IE field of the beacon frame.

* * * * *